US011626736B2

(12) United States Patent
Larsen et al.

(10) Patent No.: US 11,626,736 B2
(45) Date of Patent: Apr. 11, 2023

(54) METHOD FOR CONTROLLING NEGATIVE-SEQUENCE CURRENT FOR GRID-FORMING CONTROLS OF INVERTER-BASED RESOURCES

(71) Applicant: General Electric Company, Schenectady, NY (US)

(72) Inventors: Einar Vaughn Larsen, Ballston Lake, NY (US); Dustin Howard, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 151 days.

(21) Appl. No.: 17/113,146

(22) Filed: Dec. 7, 2020

(65) Prior Publication Data
US 2022/0181883 A1 Jun. 9, 2022

(51) Int. Cl.
*H02J 3/38* (2006.01)
*H02J 13/00* (2006.01)

(52) U.S. Cl.
CPC ........ *H02J 3/381* (2013.01); *H02J 13/00002* (2020.01); *G05B 2219/2619* (2013.01); *G05B 2219/2639* (2013.01); *H02J 2300/28* (2020.01)

(58) Field of Classification Search
CPC .. H02J 3/381; H02J 13/00002; H02J 2300/28; H02J 3/26; G05B 2219/2619;
(Continued)

(56) References Cited

U.S. PATENT DOCUMENTS 5,798,633 A 8/1998 Larsen et al.
7,016,793 B2 * 3/2006 Ye .................. G01R 19/2513
361/60
(Continued)

FOREIGN PATENT DOCUMENTS

CN 109494709 A 3/2019
EP 2523298 B1 11/2012
(Continued)

OTHER PUBLICATIONS

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.
(Continued)

*Primary Examiner* — Ziaul Karim
(74) *Attorney, Agent, or Firm* — Dority & Manning, P.A.

(57) ABSTRACT

A method for providing grid-forming control of an inverter-based resource includes receiving a negative-sequence voltage feedback of the inverter-based resource. The method also includes receiving at least one negative-sequence feedback signal of the inverter-based resource. The method also includes determining, via a negative-sequence regulator, one or more control signals indicative of a desired negative-sequence impedance of the inverter-based resource using the at least one negative-sequence feedback signal. Further, the method includes generating, via the negative-sequence regulator, a control command for the inverter-based resource based on the one or more control signals. Moreover, the method includes controlling the inverter-based resource based on the control command to achieve the desired negative-sequence impedance of the inverter-based resource.

19 Claims, 11 Drawing Sheets

(58) Field of Classification Search
CPC . G05B 2219/2639; Y02E 10/56; Y02E 10/72; Y02E 10/76; F03D 7/0284
See application file for complete search history.

(56) References Cited

U.S. PATENT DOCUMENTS

| | | | |
|---|---|---|---|
| 7,119,452 | B2 | 10/2006 | Larsen |
| 7,456,695 | B2 | 11/2008 | Weng et al. |
| 7,804,184 | B2 | 9/2010 | Yuan et al. |
| 9,270,194 | B2 | 2/2016 | Brogan et al. |
| 9,413,267 | B2 * | 8/2016 | Adloff ............... H02J 3/26 |
| 9,660,452 | B2 | 5/2017 | Routimo |
| 9,660,453 | B2 | 5/2017 | Majumder |
| 10,156,225 | B2 | 12/2018 | Huang et al. |
| 2005/0135031 | A1 * | 6/2005 | Colby ............... H02M 7/53832 361/78 |
| 2010/0052322 | A1 * | 3/2010 | Fortmann ............. F03D 7/0284 290/44 |
| 2010/0142237 | A1 | 6/2010 | Yuan et al. |
| 2010/0157634 | A1 * | 6/2010 | Yu ............................. H02J 3/38 363/56.02 |

FOREIGN PATENT DOCUMENTS

| | | | |
|---|---|---|---|
| EP | 2993753 A1 * | 3/2016 | ............. H02J 3/386 |
| EP | 2993753 A1 | 3/2016 | |
| EP | 3487027 A1 | 5/2019 | |
| WO | WO 2011/154532 A2 | 12/2011 | |
| WO | WO 2014/072159 A2 | 5/2014 | |
| WO | WO2015131958 A1 | 9/2015 | |

OTHER PUBLICATIONS

Extended European Search Report for EP application No. 21211033.2, dated May 11, 2022.

Dokus et al., Sequence Impedance Characteristics of Grid-Forming Converter Controls, Institute for Drive Systems and Power Electronics (IAL), Leibniz University Hannover, Hannover, Germany.

Vijay, et al., Unbalance mitigation strategies in microgrids, IET Power Electronics, IET, UK, vol. 13, No. 9, Jul. 24, 2020 pp. 1687-1710.

* cited by examiner

METHOD FOR CONTROLLING NEGATIVE-SEQUENCE CURRENT FOR GRID-FORMING CONTROLS OF INVERTER-BASED RESOURCES

FIELD

The present disclosure relates generally to inverter-based resources, such as wind turbine power systems and, more particularly, to systems and methods for a negative-sequence current management scheme for grid-forming control of inverter-based resources.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g. the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

As an example, FIG. 2 illustrates a schematic diagram of one embodiment of a main circuit of a grid-forming system. As shown, the main circuit includes a power-electronic converter with connections on DC and AC sides. This converter receives gating commands from a controller that creates an AC voltage phasor Vcnv at an angle of Thvcnv. The angle is with respect to a reference phasor having a fixed frequency. The DC side is supplied with a device capable of generating or absorbing power for even a short duration. Such devices may include, for example, batteries, solar panels, rotating machines with a rectifier, or capacitors. In addition, as shown, the circuit includes an inductive impedance Xcnv connecting the converter to its point of interconnection, shown as the voltage Vt and angle ThVt in FIG. 2. The electrical system behind the point of interconnect is shown as a Thevenin equivalent with impedance Zthev and voltage Vthev at angle ThVthev. This equivalent can be used to represent any circuit, including grid-connected and islanded circuits with loads. In practical situations, the impedance Zthev will be primarily inductive.

Still referring to FIG. 2, the closed-loop portion of the main control receives feedback signals from the voltage and current at the point of interconnection. Additional inputs are received from higher-level controls (not shown). While FIG. 2 illustrates a single converter as an example, any grouping of equipment that can create an electrical equivalent of a controlled voltage Vcnv behind an impedance Xcnv can have the control schemes disclosed applied to achieve the same performance benefits.

Referring now to FIG. 3, a control diagram for providing grid-forming control according to conventional construction is illustrated. As shown, a converter controller 1 receives references (e.g. Vref and Pref) and limits (e.g. VcmdLimits and PcmdLimits) from higher-level controls 2. These high-level limits are on physical quantities of voltage, current, and power. The main regulators include a fast voltage regulator 3 and a slow power regulator 4. These regulators 3, 4 have final limits applied to the converter control commands for voltage magnitude (e.g. VcnvCmd) and angle (e.g. $\theta_{Pang}$ and $\theta_{PLL}$) to implement constraints on reactive- and real-components of current, respectively. Further, such limits are based upon a pre-determined fixed value as a default, with closed-loop control to reduce the limits should current exceed limits.

To be effective, grid-forming resources must be able to maintain an internal voltage phasor that does not move quickly when there are changes in grid conditions, e.g. sudden addition/removal of loads, opening or closing of grid connections that lead to phase jumps and/or rapid change of frequency. In other words, the power from the grid-forming resource must be able to change suddenly to stabilize the grid, with a subsequent slow reset to power being commanded from a higher-level control function. In addition, the grid forming resource must be able to rapidly enforce power limits that exist due to constraints on the power-handling portions of the device, e.g. DC voltages/currents in a battery, solar array, and/or wind generating system. Such a response is needed for severe disturbances on the grid, e.g. faults where power limits will be dynamically adjusted to coordinate with grid conditions for secure recovery from the fault. Further, the grid forming resource should be able to rapidly follow changes in commands from higher-level controls, e.g. for damping mechanical vibrations in a wind turbine. Such requirements, however, can be difficult to achieve.

Existing grid forming schemes focus on positive-sequence voltages and currents and generally include a function that regulates the negative-sequence current to a setpoint of zero, similar to grid-following schemes. Therefore, such schemes ensure the entire equipment rating is available to manage the positive-sequence voltage in the grid. However, regulation of the negative-sequence current to zero is not beneficial to the power grid, as some imbalance may exist in the transmission system and loads.

In view of the foregoing, an improved system and method that addresses the aforementioned issues would be welcomed in the art. In particular, the present disclosure is directed to systems and methods for providing grid-forming control of inverter-based resources that absorb some amount of negative-sequence current to balance voltages on the grid.

BRIEF DESCRIPTION

Aspects and advantages of the invention will be set forth in part in the following description, or may be obvious from the description, or may be learned through practice of the invention.

In one aspect, the present disclosure is directed to a method for providing grid-forming control of an inverter-based resource. The method includes receiving at least one negative-sequence feedback signal of the inverter-based resource. The method also includes determining, via a negative-sequence regulator, one or more control signals indicative of a desired negative-sequence impedance of the inverter-based resource using the at least one negative-sequence feedback signal. Further, the method includes generating, via the negative-sequence regulator, a control command for the inverter-based resource based on the one or more control signals. Moreover, the method includes controlling the inverter-based resource based on the control command to achieve the desired negative-sequence impedance of the inverter-based resource.

In an embodiment, the negative-sequence feedback signal(s) may include a negative-sequence voltage feedback and/or a negative-sequence current feedback. In another embodiment, the method may also include receiving, via the negative-sequence regulator, a negative-sequence limit from an external controller, such as a negative-sequence current limit. Thus, in an embodiment, the negative-sequence limit may be a fixed value. In another embodiment, the negative-sequence limit may vary as a function of one or more operating conditions of the inverter-based resource to limit a total current within equipment ratings.

In additional embodiments, determining the one or more control signals indicative of the desired negative-sequence impedance of the inverter-based resource may include determining, via the negative-sequence regulator, an error signal based on a comparison of the negative-sequence feedback signal(s) and the negative-sequence limit, applying a gain to the error signal, and integrating, via an integrator of the negative-sequence regulator, the error signal to obtain a magnitude control signal indicative of the desired negative-sequence impedance.

In such embodiments, the integrator may have an upper limit and a lower limit, with the lower limit being equal to a minimum value of a control signal corresponding to a minimum value of the desired negative-sequence impedance of the inverter-based resource and the upper limit being equal to a maximum value of a control signal corresponding to a maximum equivalent impedance parameter of the inverter-based resource.

In further embodiments, the method may include setting the upper limit of the integrator equal to one (1) and setting the lower limit of the integrator equal to zero (0). In such embodiments, setting the upper limit of the integrator equal to one (1) and setting the lower limit of the integrator equal to zero (0), respectively, yields an impedance of the inverter-based resource at the lower limit to be equal to a physical impedance of the inverter-based resource and an infinite impedance of the inverter-based resource at the upper limit.

In several embodiments, when the negative-sequence current feedback is less than the negative-sequence limit, the error signal is a negative value that drives the integrator to the lower limit. Further, in an embodiment, when the negative-sequence current feedback is greater than the negative-sequence limit, the error signal is a positive value to provide closed loop control that drives the desired negative-sequence current value to equal the negative-sequence limit.

In particular embodiments, the method may include determining an angle of the magnitude control signal using an angle function. Thus, in certain embodiments, generating the control command for the inverter-based resource based on the one or more control signals may include generating the control command for a converter of the inverter-based resource as a function of the angle and the magnitude of the magnitude control signal.

In an embodiment, generating the control command for the inverter-based resource based on the one or more control signals may include multiplying the negative-sequence voltage feedback by the magnitude of the magnitude control signal to obtain a product and determining the control command for the converter of the inverter-based resource as a function of the product and the angle of the virtual impedance parameter.

In another aspect, the present disclosure is directed to a converter controller for providing grid-forming control of an inverter-based resource. The converter controller includes at least one controller having at least one processor. The processor(s) is configured to perform a plurality of operations, including but not limited to receiving a negative-sequence voltage feedback of the inverter-based resource, receiving a negative-sequence current feedback of the inverter-based resource, determining, via a negative-sequence regulator, one or more control signals indicative of a desired negative-sequence impedance of the inverter-based resource using the negative-sequence voltage and current feedbacks, generating, via the negative-sequence regulator, a control command for the inverter-based resource based on the one or more control signals; and controlling the inverter-based resource based on the control command to achieve the desired negative-sequence impedance of the inverter-based resource. It should be understood that the converter controller may further include any of the additional features and/or steps described herein.

In yet another aspect, the present disclosure is directed to a method for providing grid-forming control of an inverter-based resource. The method includes receiving a voltage feedback of the inverter-based resource, receiving at least one scale factor indicative of a desired impedance of the inverter-based resource, generating a voltage command for the inverter-based resource based on the voltage feedback and the scale factor, and controlling the inverter-based resource based on the voltage command to add a desired virtual impedance of the inverter-based resource in series with hardware impedance of the inverter-based resource.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
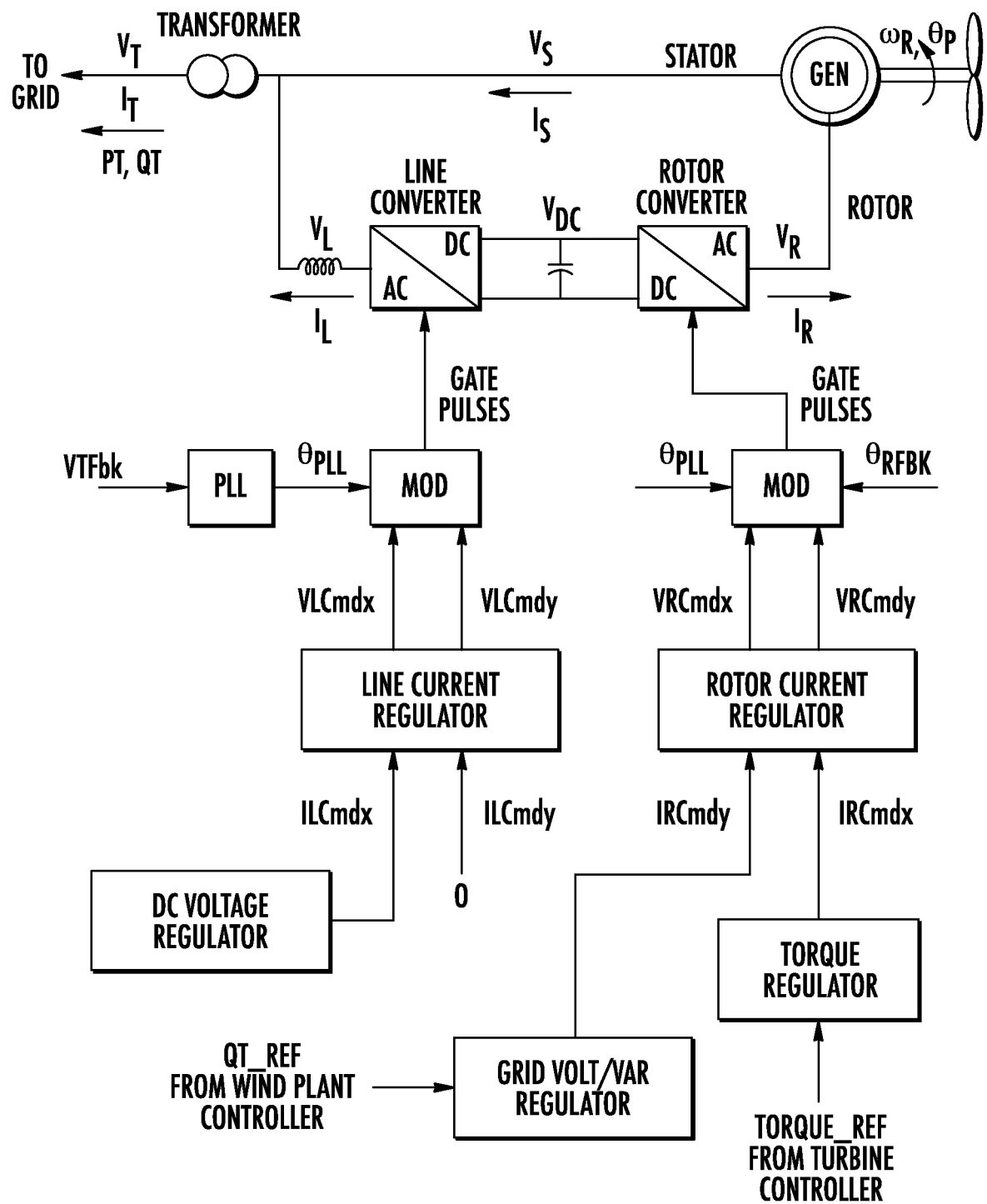
FIG. 1 illustrates a one-line diagram of a double-fed wind turbine generator with structure of converter controls for grid-following application according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for providing grid-forming control via an inverter-based resource that absorb some amount of negative-sequence current to balance voltages on the grid. Thus, in certain embodiments, the present disclosure provides a means of absorbing negative-sequence current up to a limit, where the limit is established dynamically. In further embodiments, the limit may be based upon a trade-off with positive-sequence current according to a predetermined priority when equipment rating is encountered. For current less than the limit, the characteristics can be shaped in terms of a virtual impedance. Moreover, in such embodiments, this function is performed without measuring current as a feedback. Though the systems and methods of the present disclosure are described in general herein with respect to a wind turbine power system, it should be understood that the systems and methods can be applied to any other inverter-based resource.

More specifically, in an embodiment, the systems and methods of the present disclosure involve creating a virtual impedance parameter to negative-sequence current using only measured voltages and adjusting the virtual impedance parameter to achieve a desired level of negative-sequence current, based upon the measured current. Thus, creating the virtual impedance parameter can be used during normal operation where negative-sequence current is low. Further, adjusting the virtual impedance parameter can be used to limit the amount of negative-sequence current, e.g. during unbalanced faults in the system. Moreover, the limit on the negative-sequence current may be a fixed value or may be determined by a higher-level function that e.g. maintains a limit on the total of positive- and negative-sequence current.

Figure 4:
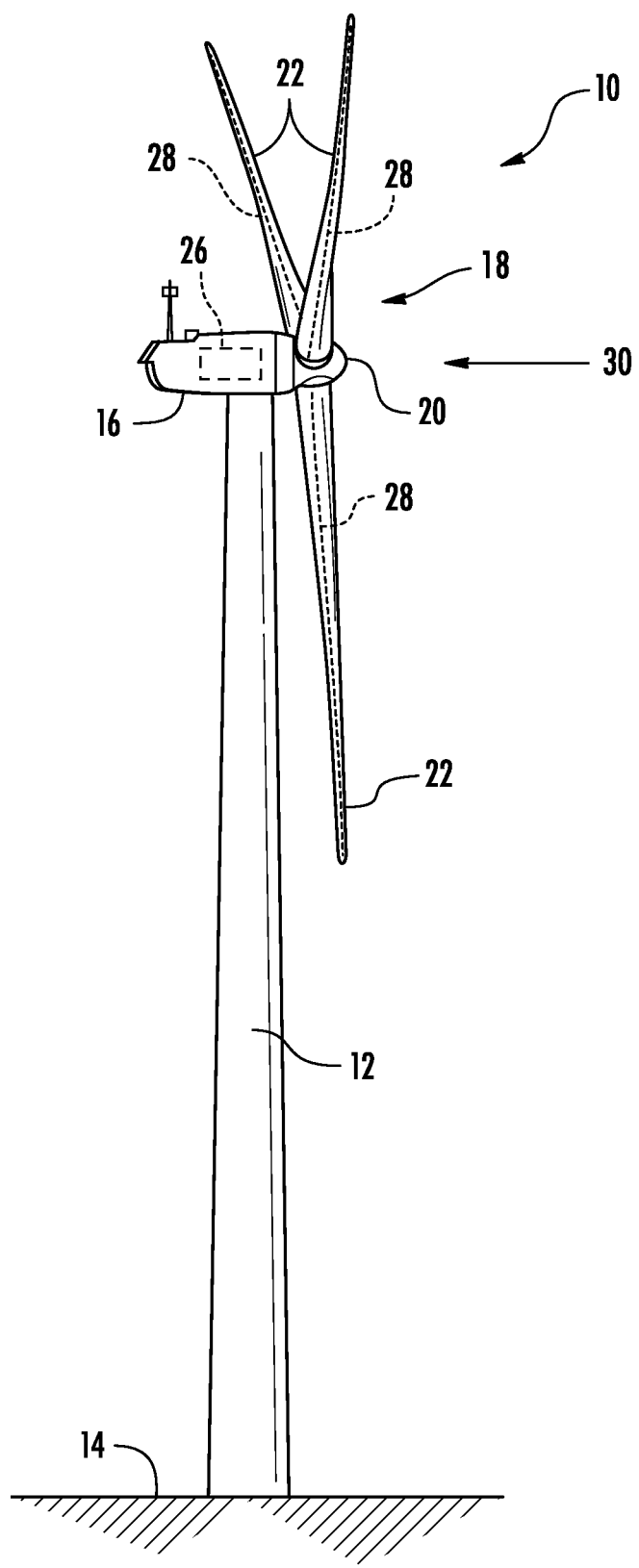
FIG. 4 illustrates a perspective view of one embodiment of a wind turbine according to the present disclosure.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 5:
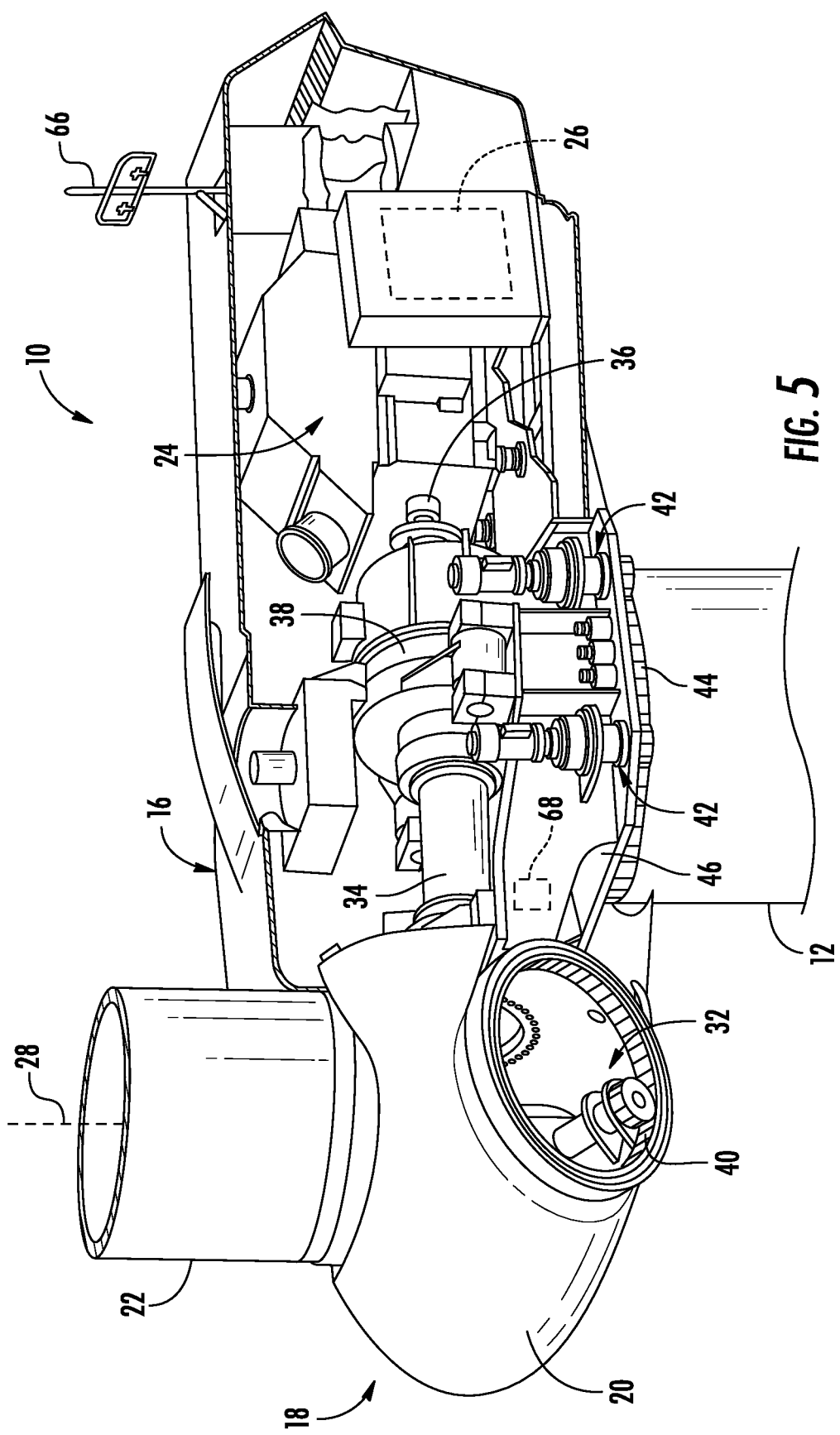
FIG. 5 illustrates a simplified, internal view of one embodiment of a nacelle according to the present disclosure.

Referring now to FIG. 5, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 6:
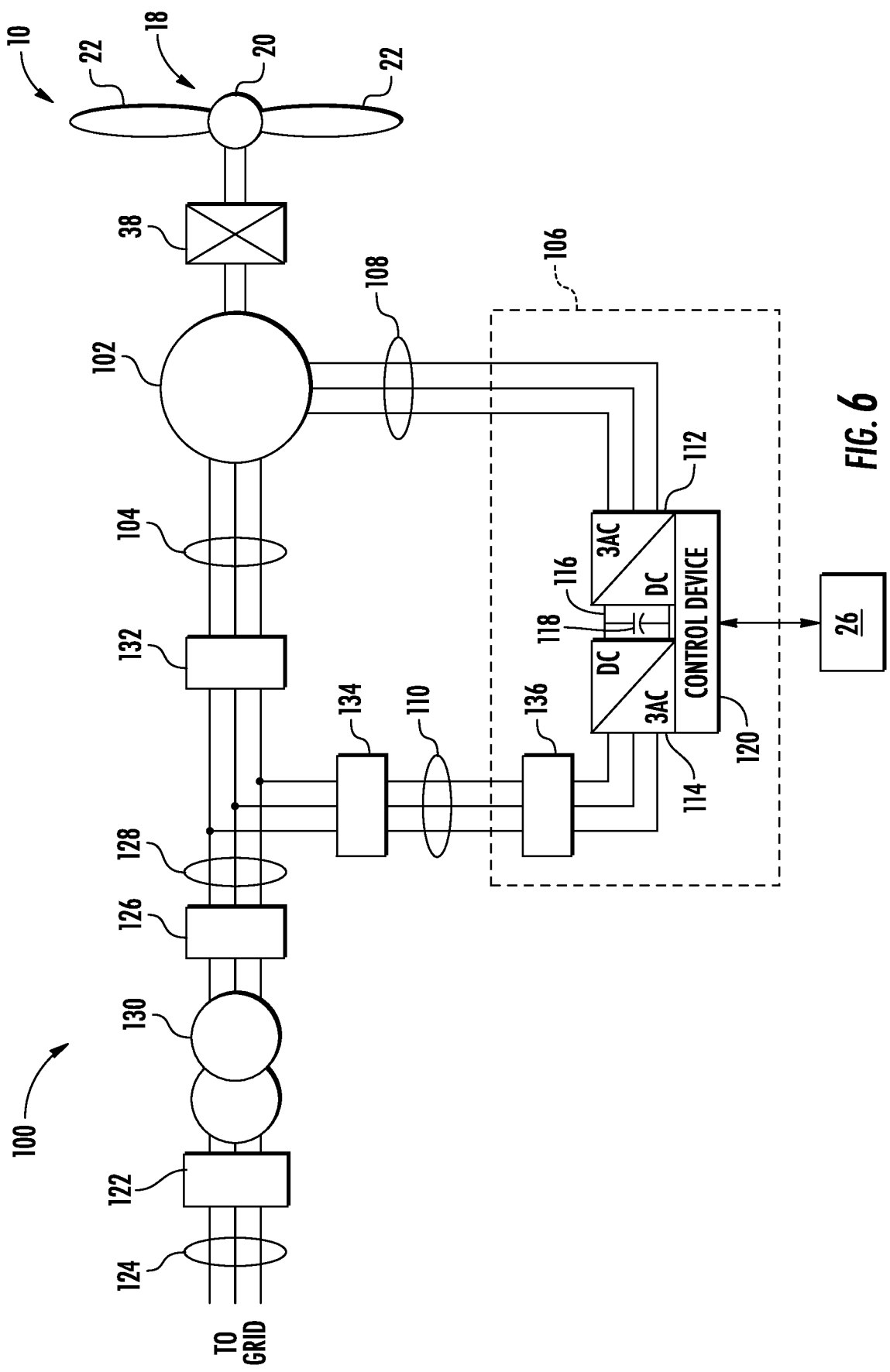
FIG. 6 illustrates a schematic view of one embodiment of a wind turbine electrical power system suitable for use with the wind turbine shown in FIG. 1.

Referring now to FIG. 6, a schematic diagram of one embodiment of a wind turbine power system 100 is illustrated in accordance with aspects of the present disclosure. Although the present disclosure will generally be described herein with reference to the wind turbine 10 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g. IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g. IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 7:
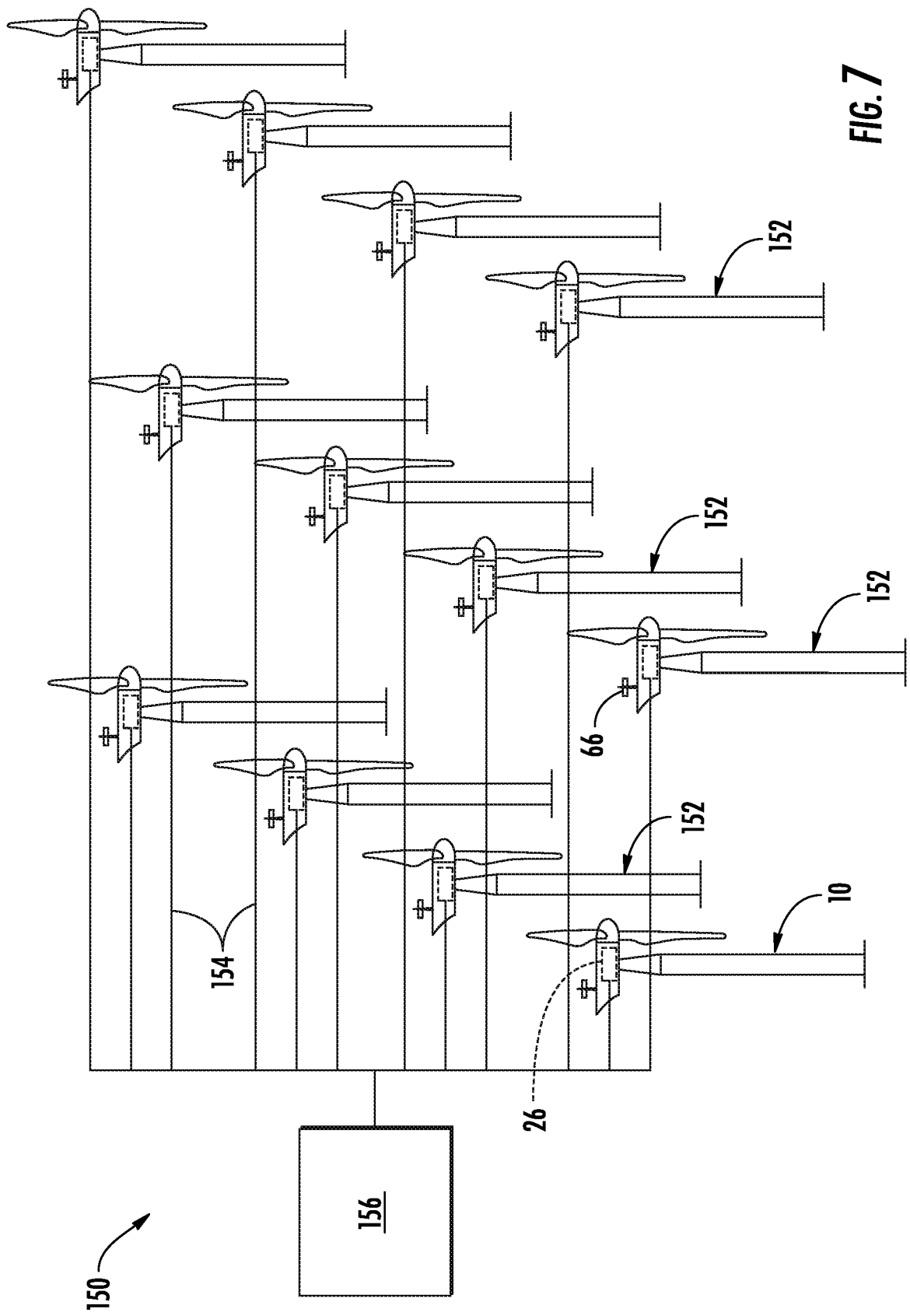
FIG. 7 illustrates a schematic view of one embodiment of a wind farm having a plurality of wind turbines according to the present disclosure.

Referring now to FIG. 7, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 52 are communicatively coupled to the farm-level controller 56, e.g. through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands across the wind turbines 52 of the wind farm 50.

Figure 8:
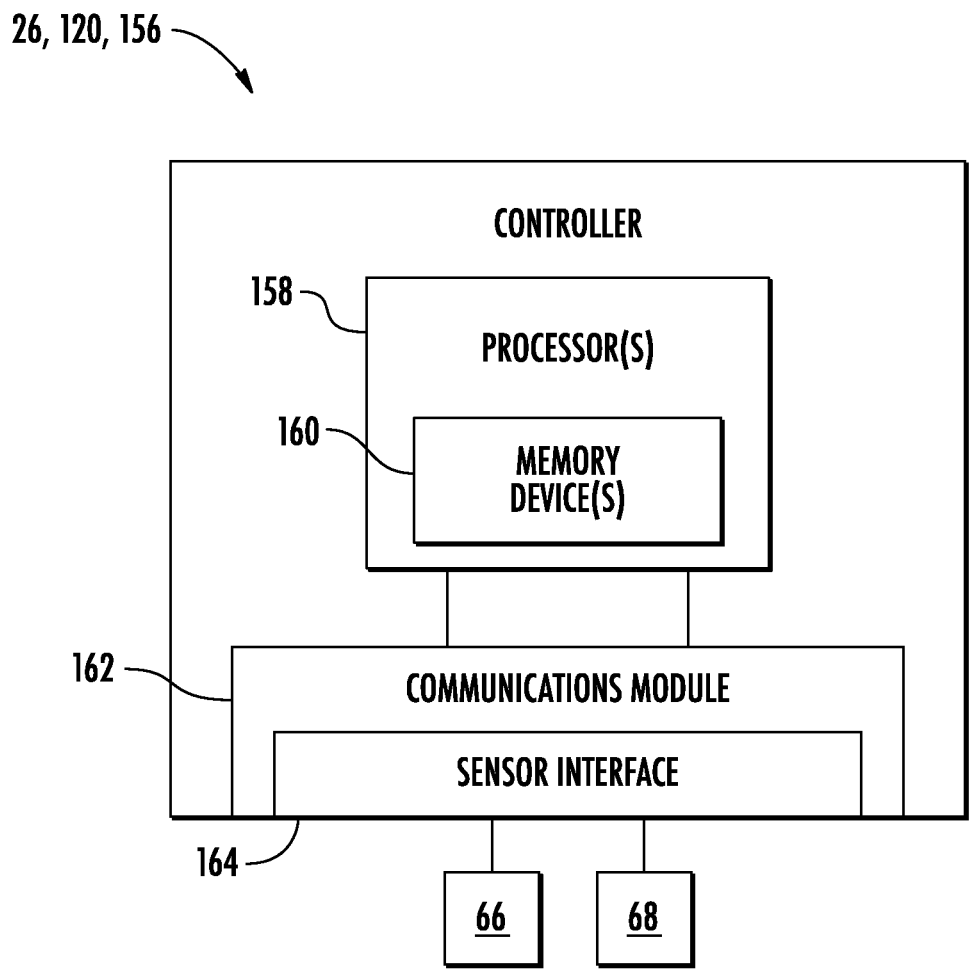
FIG. 8 illustrates a block diagram of one embodiment of a controller according to the present disclosure.

Referring now to FIG. 8, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 9:
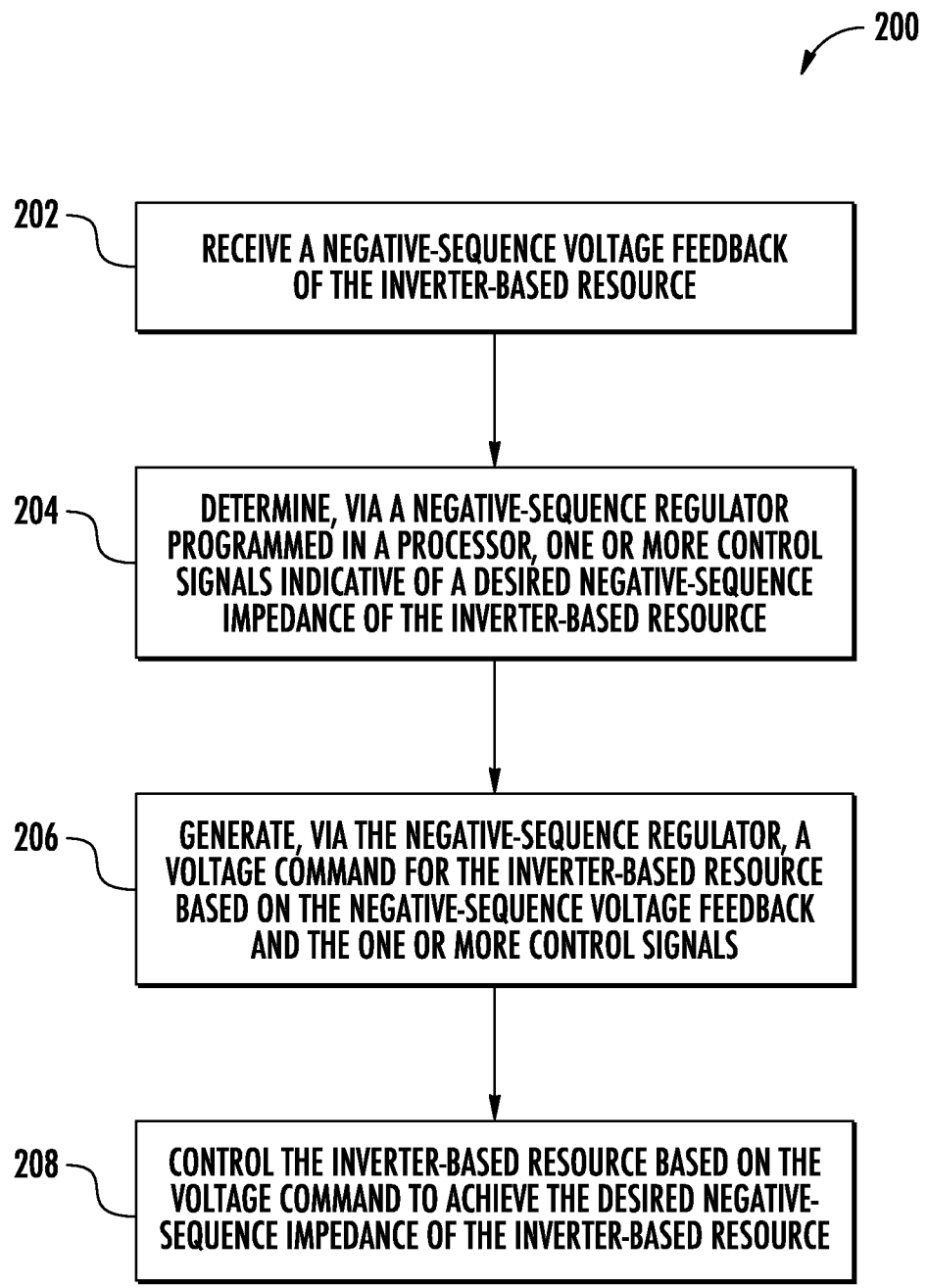
FIG. 9 illustrates a flow diagram of one embodiment of method for providing grid-forming control of an inverter-based resource according to the present disclosure.

Referring now to FIG. 9, a flow diagram of one embodiment of a method 200 for providing grid-forming control of an inverter-based resource is provided. In general, the method 200 is described herein with reference to the wind turbine power system 100 of FIGS. 4-8 and the system 300 of FIGS. 10 and 11. However, it should be appreciated that the disclosed method 200 may be implemented with any other suitable power generation systems having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes receiving a negative-sequence voltage feedback of the inverter-based resource. As shown at (204), the method 200 includes determining, via a negative-sequence regulator programmed in a processor, one or more control signals indicative of a desired negative-sequence impedance of the inverter-based resource. As shown at (206), the method 200 includes generating, via the negative-sequence regulator, a voltage command for the inverter-based resource based on the negative-sequence voltage feedback and the one or more control signals. As shown at (208), the method 200 includes controlling the inverter-based resource based on the voltage command to achieve the desired negative-sequence impedance of the inverter-based resource.

Figure 2:
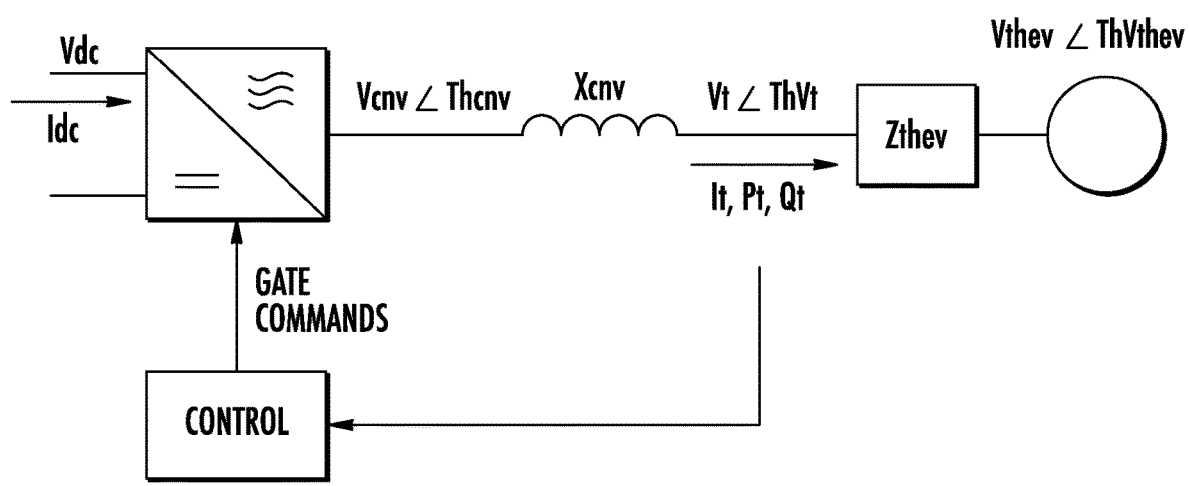
FIG. 2 illustrates a schematic diagram of one embodiment of a main circuit of a grid-forming system according to conventional construction.
Figure 3:
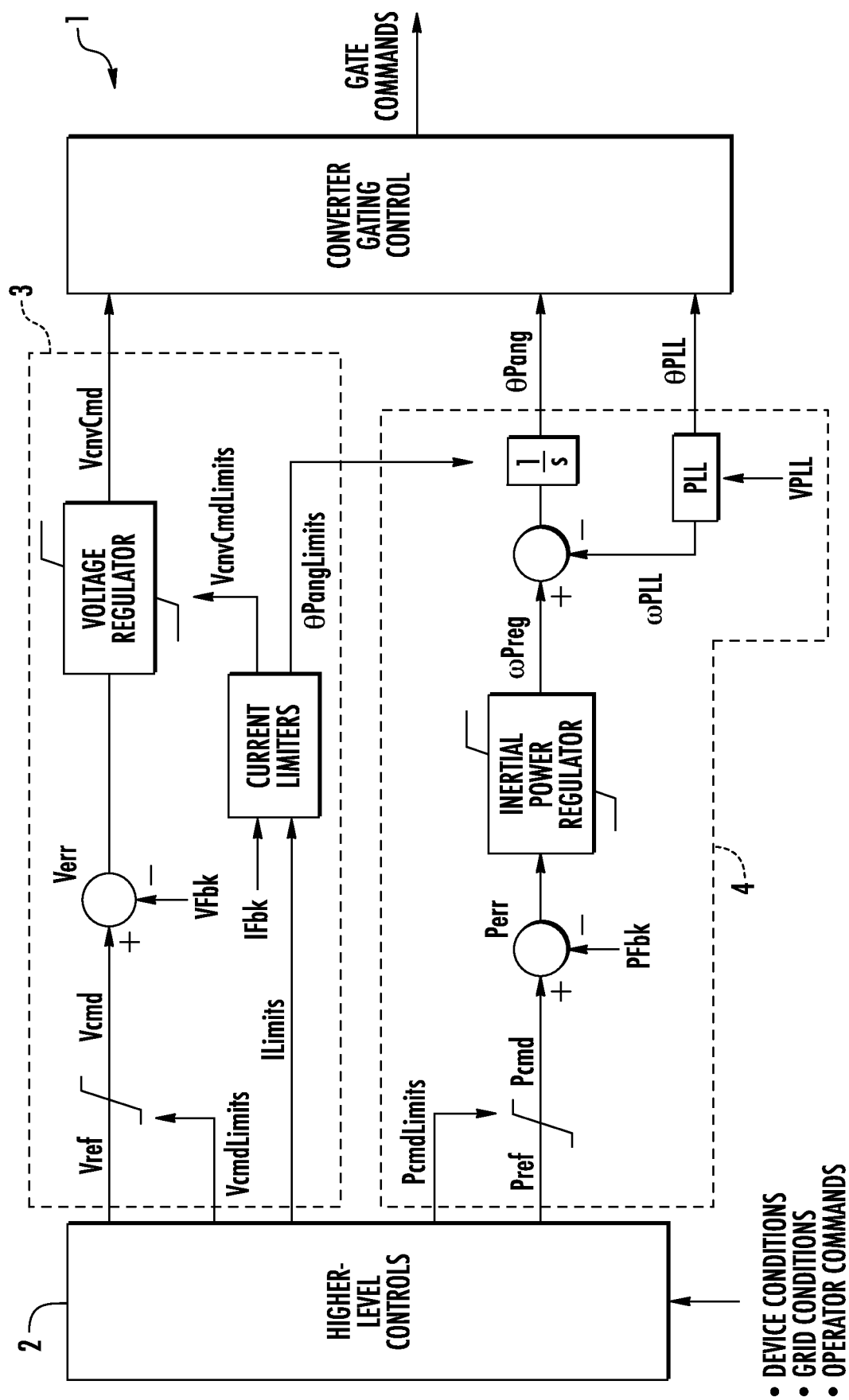
FIG. 3 illustrates a control diagram for providing grid-forming control according to conventional construction.
Figure 10:
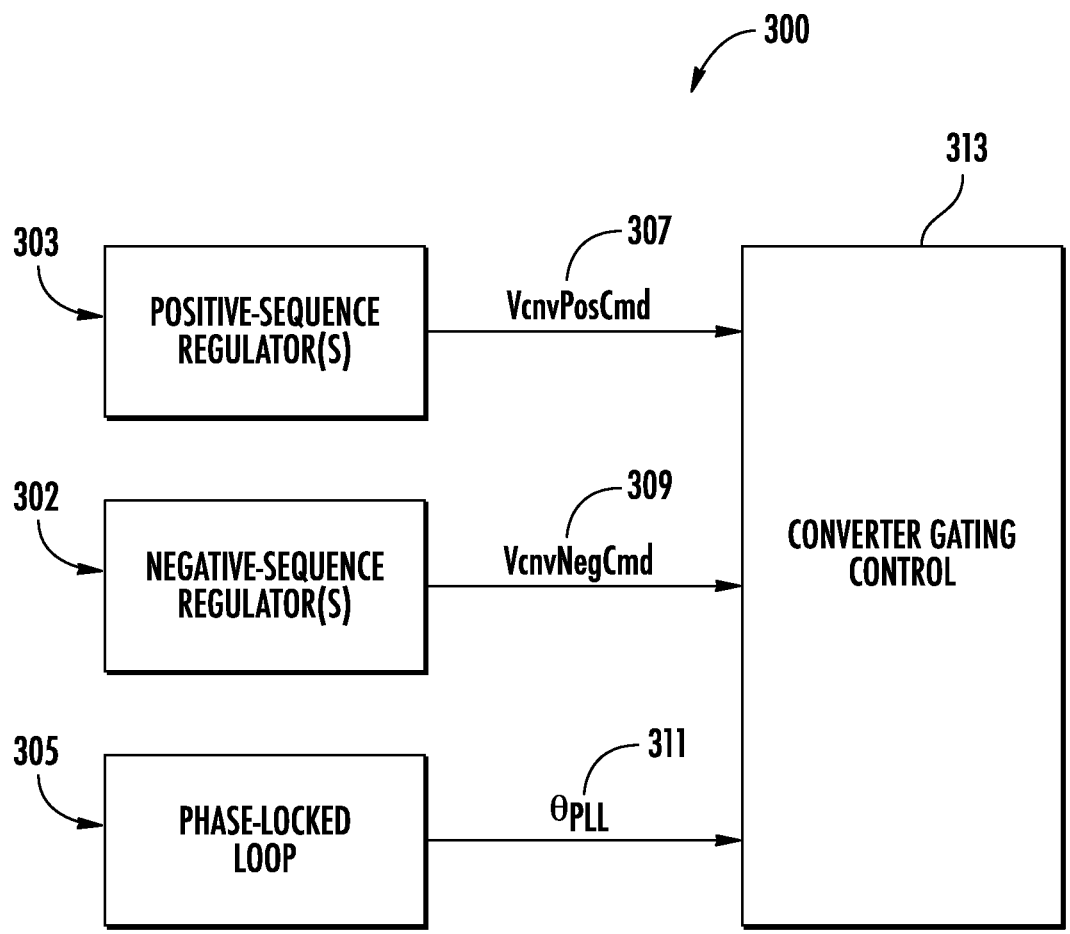
FIG. 10 illustrates a control diagram of one embodiment of system for providing grid-forming control of an inverter-based resource according to the present disclosure.
Figure 11:
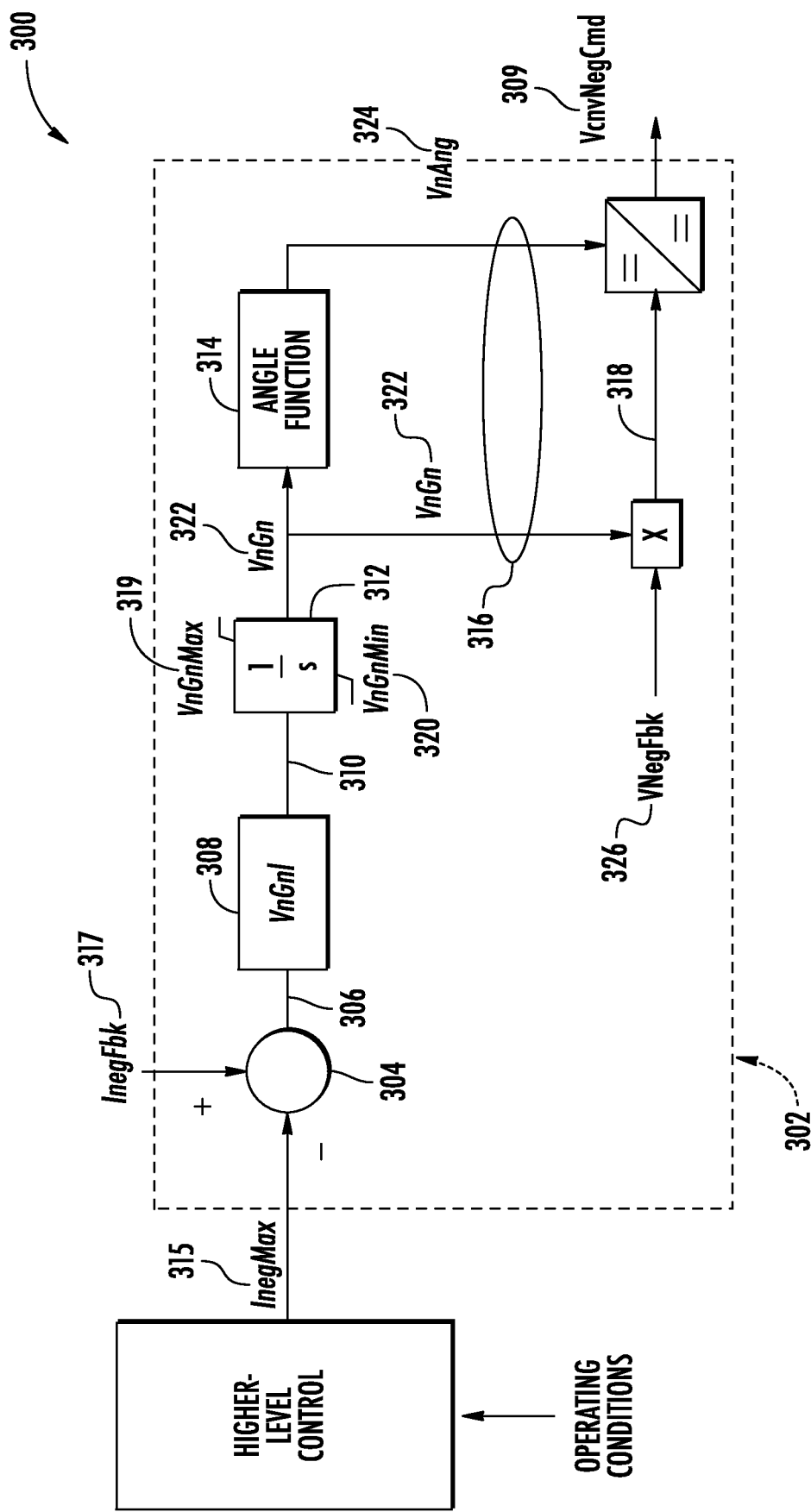
FIG. 11 illustrates a control diagram of one embodiment of a negative-sequence regulator of a system for providing grid-forming control of an inverter-based resource according to the present disclosure.

The method 200 of FIG. 9 can now be better understood with reference to the system 300 illustrated in FIGS. 10 and 11 and certain relationships relating to the system of FIG. 2. In particular, FIGS. 10 and 11 illustrate various a control diagrams of an embodiment of the system 300 for providing grid-forming control of an inverter-based resource. More specifically, as shown, FIG. 10 illustrates the system 300 having a positive-sequence regulator 303, a negative-sequence regulator 302 having a unique negative-sequence regulator programmed therein, and a phase-locked loop module 305. Thus, each of the positive-sequence regulator 303, the negative-sequence regulator 302, and the phase-locked loop module 305 generate respective command signals (e.g. VcnvPosCmd 307, VcnvNegCmd 309, and $\theta_{PLL}$ 311) for the converter gating control 313. Further, FIG. 11 illustrates details of the negative-sequence regulator 302 that can be used by the voltage regulator of the inverter-based resource.

Furthermore, referring again to the power circuit of FIG. 2, the following relationships exist:

$$It=(Vcnv-Vthev)/(Zcnv+Zthev) \qquad \text{Equation (1)}$$

$$It=(Vcnv-Vt)/(Zcnv) \qquad \text{Equation (2)}$$

where It is the current connecting the converter to its point of interconnect.

By viewing the converter and its reactor as a virtual impedance Zeq, then virtual impedance Zeq is represented below by Equation (3).

$$Zeq=Vt/It \qquad \text{Equation (3)}$$

Thus, a control function that computes Vcnv as a function of Vt is represented below in Equation (4):

$$Vcnv=Vt*VZgn \qquad \text{Equation (4)}$$

In such embodiments, the equivalent impedance Zeq can be defined by the converter impedance Zcnv and the gain VZgn, as represented below in Equation (5):

$$Zeq=Zcnv/(1-VZgn) \qquad \text{Equation (5)}$$

Notably, the converter impedance Zcnv is indicated in general form to include both a resistive and reactive component. Further, FIG. 2 illustrates only the reactive portion for clarity, which is typically the dominant characteristic of this circuit element. Accordingly, the current flow can be expressed as:

$$It=-Vthev/(Zeq+Zthev) \qquad \text{Equation (6)}$$

$$It=-Vthev/(Zcnv/(1-VZgn)+Zthev) \qquad \text{Equation (7)}$$

Thus, by maintaining the control parameter VZgn (also referred to herein a control signal 316 indicative of the desired negative-sequence impedance having both a magnitude VnGn 322 and angle VnAng 324) as constant, the converter appears as a fixed virtual impedance Zeq. In another embodiment, by adjusting the control parameter VZgn, the current can be regulated. At the extremes, VZgn may be set to zero (as further described below) to cause the converter to appear as an equivalent impedance of just the physical converter impedance Zcnv. Moreover, when VZgn is set equal to unity, the converter appears as an open circuit. This provides a means of synthesizing a negative-sequence impedance.

Referring now particularly to FIG. 11, the control function affecting converter equivalent impedance is implemented via a gain and associated angle (which, as mentioned, is referred to herein as the control signal 316 indicative of the desired negative-sequence impedance). For example, in an embodiment, VZgn may be equal to the magnitude control signal VnGn 322 at an angle of VnAng 324.

In particular, as shown, the negative-sequence regulator 302 receives a negative-sequence limit, such as negative-sequence current limit InegMax 315, which is a scalar value as indicated in italics, from a higher-level controller (e.g. the turbine controller 26 and/or the farm-level controller 156). In an embodiment, the negative-sequence limit may be a fixed value. In another embodiment, as shown, the negative-sequence limit may vary as a function of one or more operating conditions of the inverter-based resource, e.g. to maintain a desired positive-sequence current value and the desired negative-sequence current value within equipment ratings. In addition, as shown, the negative-sequence regulator 302 receives a measured negative-sequence voltage feedback VnegFbk 326, which is a phasor value with two dimensions.

Moreover, as shown, the negative-sequence regulator 302 also receives the measured magnitude of negative-sequence current feedback InegFbk 317, which is also a scalar value as indicated in italics. Thus, as shown at 304, the negative-sequence regulator 302 is configured to determine an error signal 306 based on a comparison of the negative-sequence current feedback InegFbk 317 and the negative-sequence limit InegMax 315. In addition, as shown 308, the negative-sequence regulator 302 can then apply a gain VnGnl to the error signal 306.

Still referring to FIG. 11, the output 310 from the gain module 308 can then be integrated via integrator 312 to regulate a magnitude of the control signal 316 indicative of the desired negative-sequence impedance. For example, as shown, the magnitude of the equivalent impedance parameter is represented as control signal VnGn 322, which is a scalar value as indicated in italics. Furthermore, as shown, the integrator 312 may include an upper limit VnGnMax 319 and a lower limit VnGnMin 320. For example, in an embodiment, the lower limit VnGnMin 320 may be equal to a minimum value of a control signal corresponding to a minimum value of the desired negative-sequence impedance of the inverter-based resource, whereas the upper limit VnGnMax 319 may be equal to a maximum value of a control signal corresponding to a maximum equivalent impedance parameter of the inverter-based resource. In particular embodiments, the upper limit VnGnMax 319 may be set equal to one (1), whereas the lower limit VnGnMin 320 may be set equal to zero (0). In such embodiments, setting the upper limit VnGnMax 319 equal to one (1) and the lower limit VnGnMin 320 equal to zero (0), respectively, is configured to yield an impedance of the inverter-based resource at the lower limit VnGnMin 320 to be equal to a physical impedance of the inverter-based resource. However, by setting the upper limit VnGnMax 319 to one (1), an infinite impedance of the inverter-based resource can be realized.

Thus, in such embodiments, when the negative-sequence current feedback InegFbk 317 is less than the negative-sequence limit InegMax 315, the error signal 306 will be a negative value that drives the integrator 312 to the lower limit VnGnMin 320. Moreover, in an embodiment, when the negative-sequence current feedback InegFbk 317 is greater than the negative-sequence limit InegMax 315, the error signal 306 will be a positive value to provide closed loop control that drives the desired negative-sequence current value to equal the negative-sequence limit InegMax 315.

The negative-sequence regulator 302 can then determine an angle VnAng 324 of the control signal 316 indicative of the desired negative-sequence impedance using an angle function 314 and the magnitude of the control signal VnGn 322. Thus, VnGn 322 and VnAng 324 together represent a complex scale factor indicative of a desired impedance of the inverter-based resource. The angle VnAng 324 is also a scalar value as indicated in italics. More particularly, in an embodiment, the angle VnAng 324 may be related to the magnitude control signal VnGn 322 by a predetermined function. In such embodiments, the function may be determined to cause the equivalent impedance to have a desired phase characteristic as a function of control signal VnGn 322. In particular, given a desired function of the impedance angle, the relationships defined in Equations (1)-(7) can be used to determine the angle function 314. In another embodiment, the desired phase of the equivalent impedance may be a function of the application, which would be a standard application engineering task during a project.

Thus, as shown, the negative-sequence regulator 302 provides for regulating the control signal 316 indicative of the desired negative-sequence impedance to achieve the desired negative-sequence current value for the inverter-based resource. In particular embodiments, the negative-sequence regulator 302 may receive the negative-sequence voltage feedback VnegFbk 326 of the inverter-based resource and multiply the measured negative-sequence voltage feedback VnegFbk 326 by the magnitude control signal VnGn 322 of the control signal 316 indicative of the desired negative-sequence impedance to obtain a product 318. Thus, as shown, the negative-sequence regulator 302 can then determine the voltage command VcnvNegCmd 309 for the converter of the inverter-based resource as a function of the product 318 and the angle VnAng 324 of the control signal 316 indicative of the desired negative-sequence impedance. Accordingly, the converter of the inverter-based resource can be controlled using the voltage command VcnvNegCmd 309 to achieve the desired negative-sequence current value for the inverter-based resource.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing control of an inverter-based resource connected to an electrical grid, the method comprising:
   receiving at least one negative-sequence voltage signal of the inverter-based resource;
   dynamically computing, via a negative-sequence regulator, one or more control signals indicative of a desired negative-sequence impedance of the inverter-based resource using the at least one negative-sequence voltage signal to adapt to the electrical grid and an operating point of the inverter-based resource in real time;
   generating, via the negative-sequence regulator, a control command for the inverter-based resource based on the one or more control signals; and
   controlling the inverter-based resource based on the control command to achieve the desired negative-sequence impedance of the inverter-based resource.

2. The method of claim 1, further comprising:
   receiving, via the negative-sequence regulator, a negative-sequence limit from an external controller.

3. The method of claim 2, wherein the negative-sequence limit is a fixed value.

4. The method of claim 2, wherein the negative-sequence limit varies as a function of one or more operating conditions of the inverter-based resource to limit a total current within equipment ratings.

5. The method of claim 2, wherein dynamically computing the one or more control signals indicative of the desired negative-sequence impedance of the inverter-based resource using the at least one negative-sequence voltage signal further comprises:
   determining an error signal based on a comparison of a negative-sequence current magnitude and the negative-sequence limit;
   applying a gain to the error signal; and
   integrating, via an integrator of the negative-sequence regulator, the error signal to obtain a magnitude control signal indicative of the desired negative-sequence impedance.

6. The method of claim 5, wherein the integrator comprises an upper limit and a lower limit, the lower limit being equal to a minimum value of a control signal corresponding to a minimum value of the desired negative-sequence impedance of the inverter-based resource, the upper limit being equal to a maximum value of a control signal corresponding to a maximum equivalent impedance parameter of the inverter-based resource.

7. The method of claim 6, further comprising setting the upper limit of the integrator equal to one (1) and setting the lower limit of the integrator equal to zero (0).

8. The method of claim 7, wherein setting the upper limit of the integrator equal to one (1) and setting the lower limit of the integrator equal to zero (0), respectively, yields an impedance of the inverter-based resource at the lower limit to be equal to a physical impedance of the inverter-based resource and an infinite impedance of the inverter-based resource at the upper limit.

9. The method of claim 8, wherein, when the negative-sequence current magnitude is less than the negative-sequence limit, the error signal is a negative value that drives the integrator to the lower limit.

10. The method of claim 9, wherein, when the negative-sequence current magnitude is greater than the negative-sequence limit, the error signal is a positive value that drives a desired negative-sequence voltage gain signal to a value that causes the negative-sequence current magnitude to equal the negative-sequence limit.

11. The method of claim 5, further comprising determining an angle of control signal corresponding to a desired angle of an effective negative-sequence impedance.

12. The method of claim 11, wherein generating the control command for the inverter-based resource based on the at least one negative-sequence voltage signal and the one or more control signals further comprises:
generating the control command for a converter of the inverter-based resource as a function of the angle and the magnitude of the magnitude control signal.

13. The method of claim 12, wherein generating the control command for the inverter-based resource based on the at least one negative-sequence voltage signal and the one or more control signals further comprises:
multiplying the negative-sequence voltage feedback by the magnitude of the magnitude control signal to obtain a product; and
determining the control command for the converter of the inverter-based resource as a function of the product and the angle of the virtual impedance parameter.

14. A converter controller for providing grid-forming control of an inverter-based resource, the converter controller comprising:
at least one controller comprising at least one processor, the at least one processor configured to perform a plurality of operations, the plurality of operations comprising:
receiving a negative-sequence voltage feedback of the inverter-based resource;
receiving a negative-sequence current feedback of the inverter-based resource;
dynamically computing, via a negative-sequence regulator, one or more control signals indicative of a desired negative-sequence impedance of the inverter-based resource using the negative-sequence voltage and current feedbacks to adapt to the electrical grid and an operating point of the inverter-based resource in real time;
generating, via the negative-sequence regulator, a control command for the inverter-based resource based on the one or more control signals; and
controlling the inverter-based resource based on the control command to achieve the desired negative-sequence impedance of the inverter-based resource.

15. The converter controller of claim 14, wherein dynamically computing the one or more control signals indicative of the desired negative-sequence impedance of the inverter-based resource using the negative-sequence voltage and current feedbacks further comprises:
receiving a negative-sequence limit from an external controller;
determining an error signal based on a comparison of the negative-sequence current feedback and the negative-sequence limit;
applying a gain to the error signal; and
integrating the error signal to obtain a magnitude control signal indicative of the desired negative-sequence impedance.

16. The converter controller of claim 15, wherein the integrator comprises an upper limit and a lower limit, the lower limit being equal to a minimum value of a control signal corresponding to a minimum value of the desired negative-sequence impedance of the inverter-based resource, the upper limit being equal to a maximum value of a control signal corresponding to a maximum equivalent impedance parameter of the inverter-based resource, the method further comprising setting the upper limit of the integrator equal to one (1) and setting the lower limit of the integrator equal to zero (0), wherein setting the upper limit of the integrator equal to one (1) and setting the lower limit of the integrator equal to zero (0), respectively, yields an impedance of the inverter-based resource at the lower limit to be equal to a physical impedance of the inverter-based resource and an infinite impedance of the inverter-based resource at the upper limit.

17. The converter controller of claim 16, wherein, when the negative-sequence current feedback is less than the negative-sequence limit, the error signal is a negative value that drives the integrator to the lower limit, and wherein, when the negative-sequence current feedback is greater than the negative-sequence limit, the error signal is a positive value to provide closed loop control that drives the desired negative-sequence current value to equal the negative-sequence limit.

18. The converter controller of claim 14, further comprising determining an angle of the magnitude control signal using an angle function.

19. A method for providing control of an inverter-based resource connected to an electrical grid, the method comprising:
receiving a voltage feedback of the inverter-based resource;
receiving at least one scale factor indicative of a desired impedance of the inverter-based resource;
dynamically computing a voltage command for the inverter-based resource based on the voltage feedback and the scale factor to adapt to the electrical grid and an operating point of the inverter-based resource in real time; and
controlling the inverter-based resource based on the voltage command to add a virtual impedance of the inverter-based resource in series with hardware impedance of the inverter-based resource, thereby obtaining the desired impedance.

* * * * *